United States Patent
Warnes (10) Patent No.: US 9,496,780 B2
(45) Date of Patent: Nov. 15, 2016

(54) POWER OVERLOAD PROTECTION USING HICCUP MODE

(71) Applicant: Murata Manufacturing Co., Ltd., Nagaokakyo-shi, Kyoto-fu (JP)

(72) Inventor: Frank Warnes, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 14/856,752

(22) Filed: Sep. 17, 2015

(65) Prior Publication Data
US 2016/0087542 A1    Mar. 24, 2016

(30) Foreign Application Priority Data
Sep. 19, 2014 (GB) .................................. 1416598.9

(51) Int. Cl.
  *H02M 3/335* (2006.01)
  *H02M 1/32* (2007.01)
  *H02M 1/08* (2006.01)
  *H02M 1/00* (2006.01)

(52) U.S. Cl.
  CPC ............. *H02M 1/32* (2013.01); *H02M 1/08* (2013.01); *H02M 3/33507* (2013.01); *H02M 2001/0003* (2013.01)

(58) Field of Classification Search
  CPC .............................. H02M 1/32; H02M 3/335
  See application file for complete search history.

(56) References Cited

U.S. PATENT DOCUMENTS

| | | | |
|---|---|---|---|
| 6,411,483 B1 | 6/2002 | Sarles et al. | |
| 8,374,003 B2* | 2/2013 | Matsumoto | H02M 3/33592 363/21.01 |
| 8,416,584 B2* | 4/2013 | Zhan | H02M 3/33507 363/21.12 |
| 8,576,584 B2* | 11/2013 | Hosotani | H02M 3/33523 363/21.05 |
| 2011/0211376 A1 | 9/2011 | Hosotani | |
| 2013/0093356 A1* | 4/2013 | Green | H02M 3/33523 315/297 |
| 2014/0376273 A1* | 12/2014 | Hosotani | H02M 1/32 363/21.02 |

FOREIGN PATENT DOCUMENTS

EP    0 411 147 A1    2/1991

OTHER PUBLICATIONS

Official Communication issued in International Patent Application No. GB1416598.9, mailed on Feb. 11, 2015.

* cited by examiner

*Primary Examiner* — Emily P Pham
(74) *Attorney, Agent, or Firm* — Keating & Bennett, LLP (57) ABSTRACT

A DC-to-DC converter includes a transformer including a primary transformer coil connected to a power input terminal; a secondary transformer coil connected to a power output terminal; a switching circuit including a first sense circuit that detects a voltage condition of the transformer, the voltage received at the first sense circuit being used to regulate the duty cycle of the switch and to initiate a hiccup mode that dissipates power in the primary and/or secondary windings when the voltage condition detected at the first sense circuit indicates an overload of the transformer; a second sense circuit that detects an over-current condition at the switch and/or primary winding; and a further feedback path connected between the second sense circuit and the first sense circuit that provides a second signal to the first sense circuit to boost the first signal when an overload is detected, and to initiate the hiccup mode.

12 Claims, 4 Drawing Sheets

POWER OVERLOAD PROTECTION USING HICCUP MODE

BACKGROUND OF THE INVENTION

1. Field of the Invention

The present invention relates to a power converter, and in particular to a power converter including an overload protection function known as a hiccup mode.

2. Description of the Related Art

In a flyback converter, the input and output sides of the circuit are isolated from one another via the primary and secondary coils of a transformer. To ensure reliable operation of the converter, a control signal indicating the voltage or current condition of the transformer is passed from the output side of the converter control circuit to the input side, so that the switching of the primary and second transformer coils can be properly regulated. Converter control circuits typically operate according to voltage mode control or current mode control, depending on the type of control signal that is used, a voltage sense signal or a current sense signal, for example.

Both control methods require a signal related to the output voltage of the transformer to be fed back to the converter control circuit. There are two common ways to feedback an output sense voltage. First, coupling the secondary side circuit (the output stage) of the transformer to the control circuit using an opto-coupler, or alternately, using a separate winding (an auxiliary transformer) on the transformer coil, and relying on the cross regulation of the design to feed back an appropriate voltage signal to the control circuit. Opto-couplers provide tight voltage and current regulation properties, but are more complex and costly to install than auxiliary transformers. Auxiliary transformers on the other hand, while not providing as good regulation as opto-couplers, are less costly and tend to be more reliable in long term operation.

The purpose of the converter control circuit is to regulate the switching or duty cycle of the primary transformer coil to achieve a suitable and predicted voltage output at the secondary circuit or output stage, as well as to ensure safe operation. Some Pulse Width Modulator (PWM) power supply controllers provide what is known as "hiccup mode" short circuit protection against overloads. Hiccup-mode operation of a power supply protects the power supply from damage due to an over-current fault condition. It also allows the power supply to restart when the fault is rectified.

Hiccup mode may be triggered when the control circuit senses a reduction in the output sense voltage of the transformer. For example, if a reduction in output voltage to say 60% of the expected value is detected, the control circuit interprets this as an overload condition. The control circuit shuts off the power supply for a given time and then attempts to restart the power supply again. If the overload condition has been removed, the power supply will start up and operate normally; otherwise, the controller will see another overload event and shut off the power supply again, repeating the previous cycle. By repeatedly switching off and restarting the converter circuit, the hiccup mode results in greatly reduced power loss.

In a primary side regulated converter, where voltage feedback is provided by an auxiliary winding, hiccup mode of operation is not however possible because imperfect cross regulation prevents the voltage on the feedback winding from reducing when the output load is high and the auxiliary load is low. It has been known to try and solve this problem by using overload protection methods such as: fuses, PTCs (Positive Temperature Coefficient) sensor and thermal trips, secondary side feedback using opto-isolated feedback, or direct connection (non-isolated), and secondary side current limit circuits. However, these methods are costly and can lead to complex circuit designs.

Thus, it would be desirable to provide an improved converter in which overload conditions can be readily detected, allowing reliable triggering of hiccup mode.

SUMMARY OF THE INVENTION

A preferred embodiment of the present invention provides a DC-to-DC converter including a power input terminal and a power output terminal, the converter including: a transformer including a primary transformer coil connected to the power input terminal, and a secondary transformer coil connected to the power output terminal; a switching circuit including a switch and a switch controller, the switch controller controlling the duty cycle of the switch to supply a periodic signal to energize the primary transformer coil; the switching circuit including a first sense circuit that detects a voltage condition of the transformer, the voltage condition received at the first sense circuit being used to regulate the duty cycle of the switch and to initiate a hiccup mode that dissipates power in the primary and/or secondary windings when the voltage condition detected at the first sense circuit indicates an overload of the transformer; and a second sense circuit that detects an over-current condition at the switch and/or primary winding; an auxiliary winding electromagnetically coupled to the primary and/or the secondary transformer coils of the transformer that feeds back to the first sense circuit a first signal indicating a voltage condition at the transformer; a further feedback path connected between the second sense circuit and the first sense circuit that provides a second signal to the first sense circuit to boost the first signal when an overload is detected, and to initiate the hiccup mode.

The first sense circuit may include a voltage feedback terminal that receives the first signal. The voltage condition indicating an overload of the transformer may be a reduction in the voltage sensed by the sense circuit below a first threshold.

Further, the auxiliary winding may be electrically coupled to the feedback input terminal of the switch controller, via a diode and a resistor arranged in series.

The switch controller may include an error amplifier that regulates the duty cycle of the switch based on the first signal received at the first sense circuit, the error amplifier providing an error signal that indicates whether the duty cycle should be increased or decreased; and the switch controller may include an error amplifier output pin at which the error signal is output.

In the converter, when the second sense circuit detects an overload current, the switch controller may reduce the duty cycle of the switch, causing the error signal to saturate.

The error signal from the error output pin of the switch controller may be fed back to the first sense circuit as the second signal.

The error signal may be fed back to the first sense circuit via a comparator circuit, the comparator circuit comparing the error signal against a reference voltage, and outputting the second signal to the first sense circuit, when the error signal is detected as being sufficiently large in comparison to the reference voltage.

The comparator circuit may include an operational amplifier. The error signal may be input at the inverting pin of the operational amplifier, causing the operational amplifier to saturate to a low value when on overload is detected at the second sense circuit.

The comparator circuit may include a diode regulator, and the error signal may be input at the input pin of the diode regulator, causing the regulator to saturate to a low value when on overload is detected at the second sense circuit.

The converter may include a capacitor connected between ground and the inverting pin of the operational amplifier or regulator diode.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
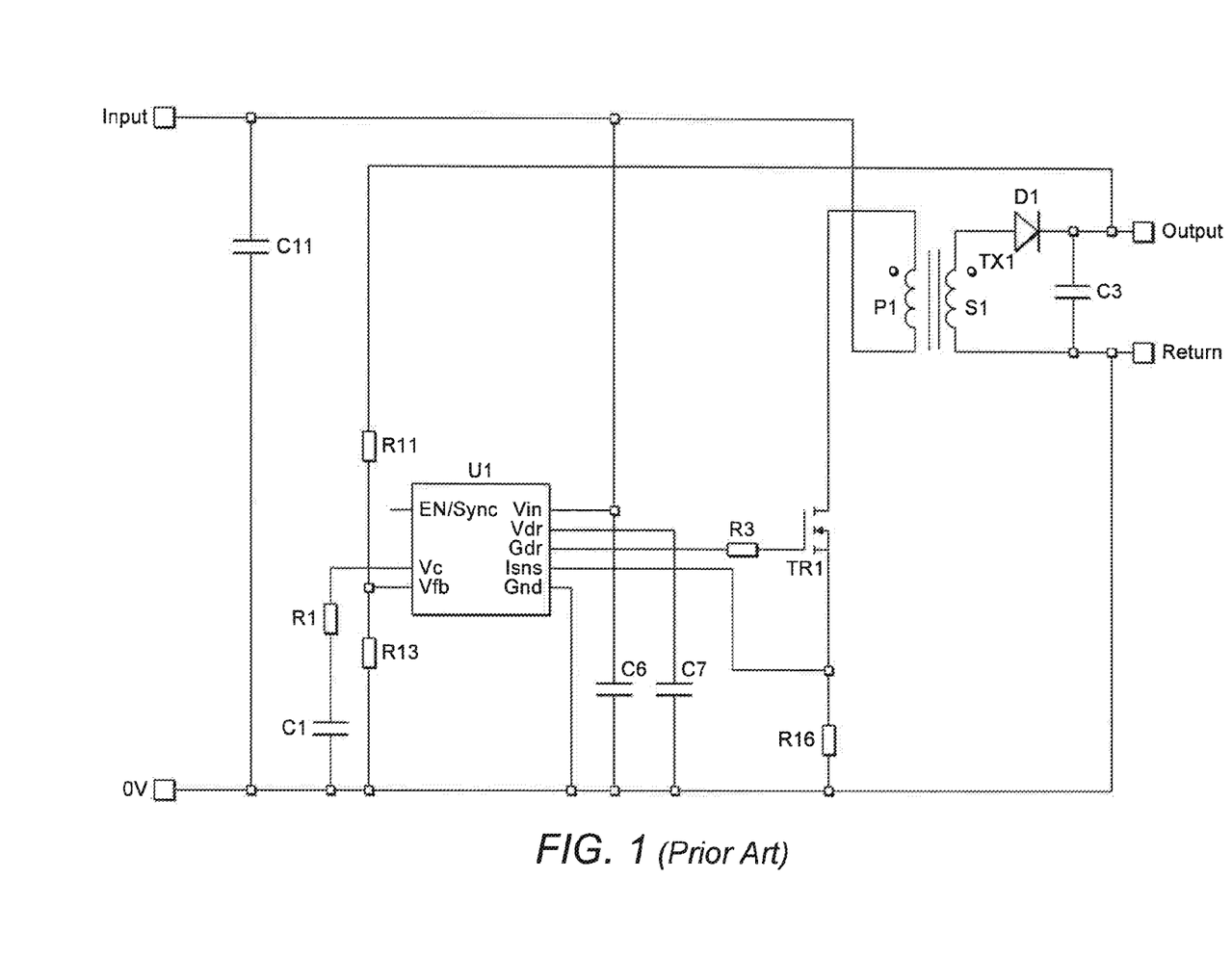
FIG. 1 is an illustration of a prior art DC-to-DC converter.

FIG. 1 illustrates a known DC-to-DC converter. For the purposes of illustration, a flyback converter is shown, but other topologies of converter, such as a forward converter, are also acceptable for use in such a circuit.

The converter receives an input voltage Vin at the Input terminal and a ground signal at the 0 V input. Connected to these two power rails are a switching circuit and a converter circuit. Capacitor C11 connects between the Input terminal and ground at the 0 V input, and acts to smooth out any variations present within the input voltage.

The switching circuitry includes switch TR1 and control circuit U1. The input voltage Vin is switched across the primary transformer coil P1 of the converter circuit by switch TR1. In FIG. 1, switch TR1 is a Metal Oxide Field Effect Transistor (MOSFET) which is controlled to either be in a conducting or non-conducting state by the control circuit U1. When the transistor TR1 in the switching circuitry is conducting, the input voltage Vin is applied across the primary windings P1 of the transformer TX1, and energy is stored in the transformer TX1 in the resulting magnetic field. When the transistor TR1 in the switching circuitry is in a non-conducting state, the magnetic field dissipates and a current subsequently flows through the secondary windings S1 of the transformer TX1. This current is regulated by the diode D1 and capacitor C3 and converted into a DC voltage applied between the OUTPUT and RETURN terminals. The converted voltage may then be used to supply the input stages of switched-mode power supplies or power electronics devices, for example.

The control circuit U1 may be a Pulse Width Modulation (PWM) controller U1. A switching signal is received at the gate terminal of MOSFET TR1 from the controller via resistor R3. The drain of TR1 is connected to the primary windings P1, and the source is connected in series to resistor R16 and then to the 0 V (ground) power rail. Transistor TR1 as illustrated is an Enhancement-mode N-channel MOSFET, although other transistor types can be used. Controller U1 may be provided as part of an integrated circuit (IC) incorporated within the circuitry depicted in FIG. 1

The converter circuit includes a flyback transformer TX1, including primary windings P1 and secondary windings S1. The primary and secondary windings P1 and S1 are wound around a transformer core, for example, one made of laminated soft iron. In alternative arrangements, it is possible to use other materials for the core, or the core may be absent in which case the windings are air-cored. In FIG. 1, the output of the secondary side transformer circuit is fed back to the controller U1 for regulation. Specifically, the OUTPUT terminal of the secondary side circuit is connected by resistor R11 to a feedback pin Vfb of the controller U1, and the RETURN terminal is connected to ground.

The PWM controller U1 illustrated in FIG. 1 will now be described in more detail. In FIG. 1, the PWM controller U1 is provided as an integrated circuit. Other PWM controllers could be used. The IC shown has a Gate Drive (Gdr) terminal which connects to the gate of MOSFET TR1 via series resistor R3 and controls the switching or duty cycle of the MOSFET TR1.

The input pin (Isns) is connected to a point between resistor R16 and the source terminal of switching MOSFET TR1, and provides a current sense input for the PWM controller U1 (the other terminal of the current sense resistor R16 connects to ground). The current sense pin Isns allows sensing of the switching current through the MOSFET for regulation and current timing. As will be described, it also allows PWM controller U1 to detect an overcurrent condition in the switch and primary side winding, and if necessary reduce the duty cycle of the switch accordingly.

The Vfb pin receives an output voltage sense signal for the purposes of feedback. The pin connects via resistor R11 to the output voltage signal drawn from the secondary side of the transformer, and connects via resistor R13 to ground. The resistor configuration defines a voltage divider for regulation and setting of the output voltage. In normal operation, the PWM controller U1 uses the signal received at the voltage feedback pin Vfb as an input to adjust the duty cycle signal provide at the gate drive terminal Gdr. In this case, the PWM controller U1 will increase the duty cycle if the output voltage is detected as falling off. In controllers with hiccup mode protection, such as the PWM controller U1, the voltage received at the Vfb pin is also used to initiate the hiccup mode. Thus, when an overload occurs, and the output voltage detected at the feedback terminal Vfb has fallen below a detection threshold, such as 60% or less of its typical value, hiccup mode will be initiated. Both (1) detection of the low voltage at the feedback terminal Vfb and comparison with a reference voltage acting as the overload sense threshold, and (2) adjustment of the duty cycle in response to variations in the normal output voltage sense circuit, are managed by the circuitry provided in the PWM controller U1.

The Vc pin provides an output from the internal voltage error amplifier of the PWM controller U1. The Vc pin connects to ground via series resistor R1 and capacitor C1, which define an external compensator network to stabilize the converter. As noted above, regulation of the transformer TX1 is achieved by feeding back from the secondary side a portion of the output voltage into the Vfb pin of the PWM controller U1. This voltage is compared to an internal 1.2 V reference voltage by the internal error amplifier. The output of the error amplifier linearly controls the switching duty cycle of the converter and is made available externally at pin Vc of U1 for the purpose of adding compensation to the error amp. The current feedback loop provided by the Isns pin to the controller is downstream of the error amplifier, and the current feedback loop will dominate the output.

The Vin pin is connected to the high voltage rail (Vin) directly and to the 0 V or low voltage rail via a capacitor C6, and the ground pin (Gnd) is connected directly to the ground or 0 V rail. The driving voltage pin (Vdr) is shown as bypassed in this configuration, being connected to ground by capacitor C7, which can have a capacitance value, for example, of 1.0 μF. The Enable and Synchronization Terminal (EN/Sync) pin, when connected, allows an oscillating input signal to be applied to the PWM controller U1, and the falling edge of such an input signal synchronizes the PWM controller's U1 internal oscillator. In this preferred embodiment, the EN/Sync pin is unused.

The circuit shown in FIG. 1 is therefore a secondary side regulated switch controller. For current limiting purposes, PWM controller U1 monitors the amplitude of the primary side switch current by measuring the voltage across the sense resistor R16. In an overload situation, the peak voltage into the Isns pin reaches a pre-set 0.4 V limit threshold, and the duty cycle of the controller is reduced. As a result of the high current being drawn from the output and the subsequent reduction of the duty cycle, the output voltage starts to decrease. The output voltage is fed back through the resistor R11 to voltage feedback input Vfb causing the sensed voltage to decrease. When the voltage on the Vfb pin of PWM controller U1 decrease to about 60% of the normal regulated value, the PWM controller U1 initiates hiccup mode. If the overload fault remains indefinitely, the power supply will stay in hiccup mode therefore keeping the power loss below acceptable levels.

For the purposes of illustration, the circuit that has been described above is not isolated. This is generally undesirable, however, and it is usually preferred to build in isolation using opto-coupling devices. These add cost and complexity to the circuit.

Although primary side regulation provided by an auxiliary winding would solve the isolation problem, the voltage reduction experienced at the Vfb pin when an auxiliary winding is used is not sufficient to trigger the hiccup mode, due to poor cross regulation of the windings.

First Preferred Embodiment

A first preferred embodiment of the present invention will now be described with reference to FIG. 2.

Figure 2:
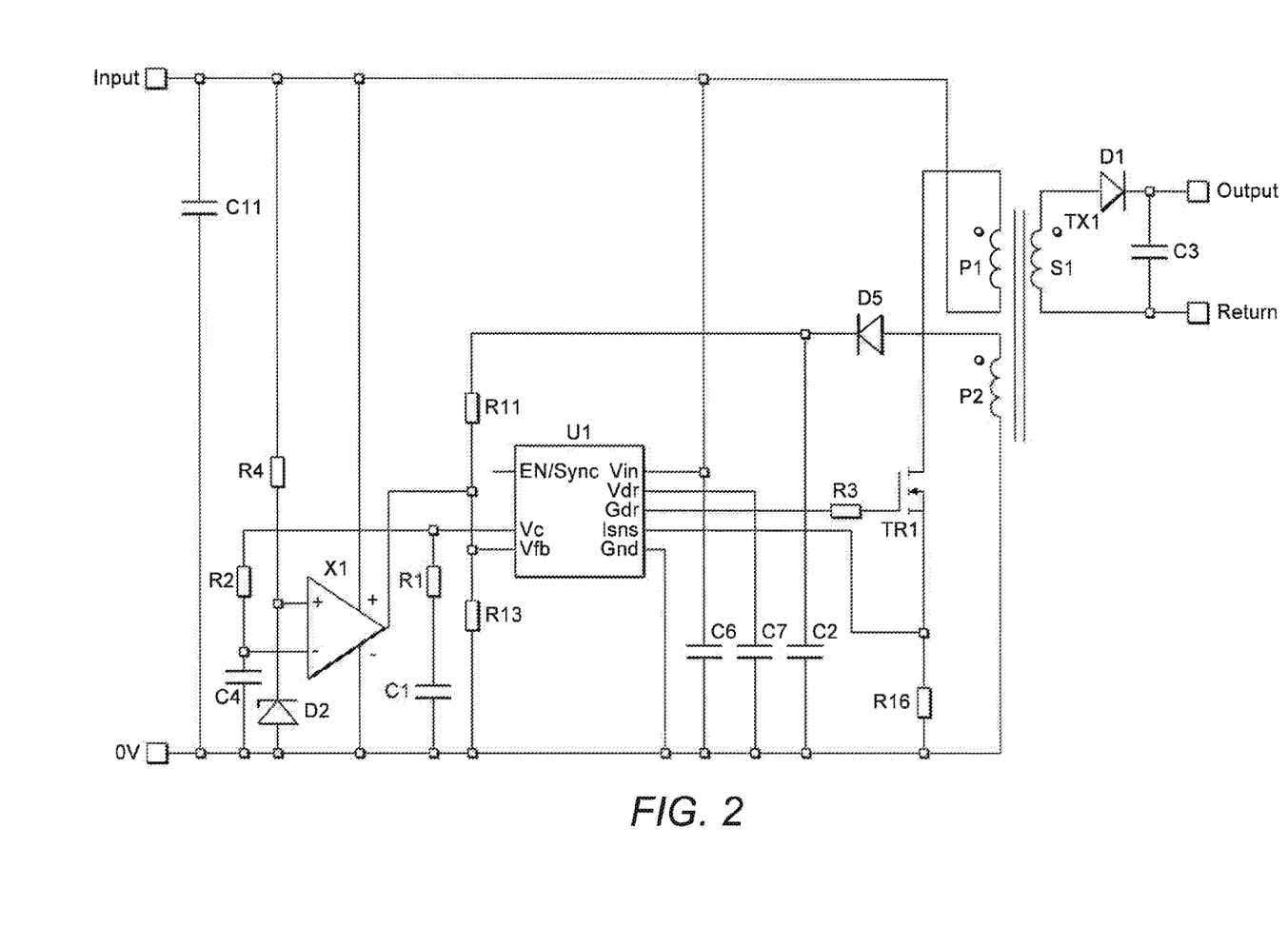
FIG. 2 is an illustration of a first preferred embodiment of the present invention.

The circuit in FIG. 2 shows a primary side regulated flyback power supply circuit including auxiliary primary side transformer winding P2. As before, switching circuit is implemented using a switching MOSFET TR1 and a PWM Controller U1. The drain terminal of the MOSFET TR1 connects to one side of the primary transformer winding P1, while the source of MOSFET TR1 connects to the 0 V voltage rail. As is known in the art, the operation of the switching MOSFET TR1 is controlled by signal output from the PWM controller U1. Specifically, the Gate Drive terminal Gdr of the PWM controller U1 is connected to the gate of the switching MOSFET TR1, so that the MOSFET TR1 can be switched on and off as desired to control the energizing of the primary coil P1. The ground terminal Gnd of the PWM controller U1 is connected to the low voltage rail (0 V). The operation of the controller is otherwise assumed to be identical to that described above.

Auxiliary winding P2 is connected on the primary side of the transformer coil. One side of the auxiliary winding P2 is connected to ground, and the other side is connected to the voltage feedback Vfb pin of the power controller through forward biased rectifier diode D5 and resistor R11 in series. Diode D5 rectifies the alternating current signal from the auxiliary winding P2 and converts it into a direct current signal that feeds back to the PWM controller U1. Capacitor C2 connects ground and a point between the diode D5 and the resistor R11. Capacitor C2 smoothes out the output from the auxiliary winding P2. The auxiliary winding P2 is used to provide the regulation function for the switching circuit while maintaining isolation between the secondary and primary sides.

The input stage to the switching circuit further includes a comparator circuit including comparator X1, precision reference diode D2, resistors R2 and R4, and capacitor C4. The comparator circuit X1 includes a non-inverting input terminal (+), an inverting input terminal (−), an output terminal, a positive power supply terminal, and a negative power supply terminal. The power supply terminals are connected to the high voltage input line and the ground line, respectively. The output terminal of the comparator is connected to the voltage feedback pin Vfb, and is used to provide a signal to trigger hiccup mode when a state indicating an overload condition is detected. The operation of the circuit will now be defined in more detail.

The non-inverting input terminal of the comparator X1 is connected to the intermediate point between reference diode D2 and resistor R4, which are themselves connected in series between the ground and the input voltage line. In this preferred embodiment, diode D2 is a reference diode providing a 2.5 V reference voltage to the non-inverting pin of the comparator.

The inverting input pin of the comparator X1 is connected to the error amplifier output Vc of the power controller U1 via series resistor R2. The inverting input terminal connects to the intermediate point between resistor R2 and capacitor C4 which connects to the ground line. Resistor R1 and capacitor C1 are arranged in parallel with resistor R2 and capacitor C4 to provide stabilization of the output signal.

Figure 3:
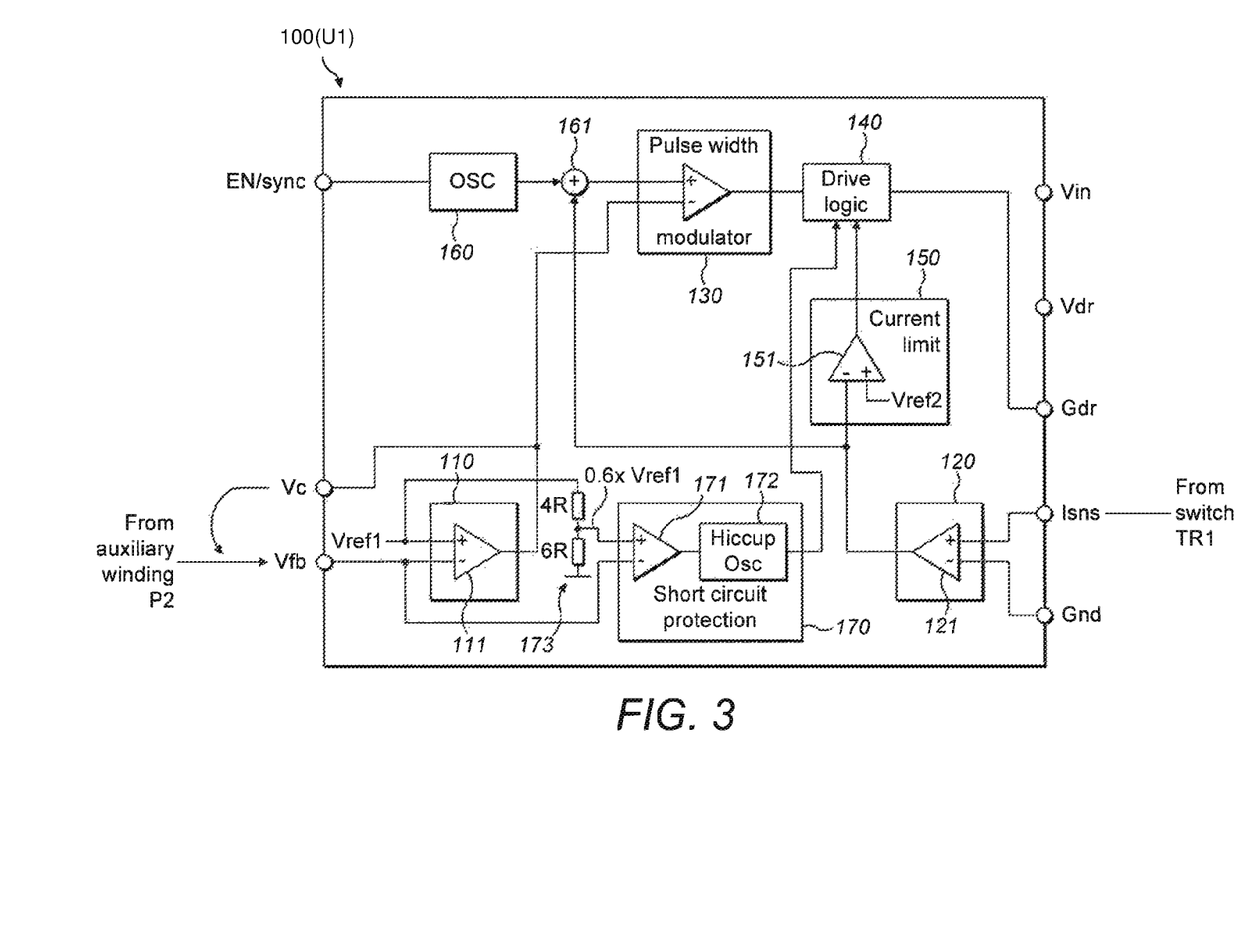
FIG. 3 is an illustration of an example control circuit, such as that used in the first preferred embodiment of the present invention.

Referring to FIG. 3, an example control circuit 100 of the PWM controller U1 will now be described.

As discussed above, control circuit 100 includes a number of input/output pins or terminals to make connections with external circuits. The pins or terminals include enable/synchronize terminal (EN/Sync), error amplifier output terminal (Vc), voltage feedback terminal (Vfb), input terminal (Vin), driving voltage terminal (Vdr) terminal, gate drive terminal (Gdr), current sense terminal (Isns), and ground terminal (Gnd).

As can be seen in FIG. 3, the control circuit 100 includes a first sense circuit 110 that detects a feedback voltage at voltage feedback terminal Vfb, a second sense circuit 120 that detects a current received at current sense terminal Isns, a Pulse Width Modulator comparator circuit 130, a drive logic circuit 140, a current limit circuit 150, an Oscillator circuit 160, and a Short Circuit protection circuit 170. The control circuits may contain other circuitry, but illustration and discussion of such other circuitry is omitted for simplicity.

Drive logic 140 outputs a drive signal to the gate drive terminal Gdr based on the inputs received by the first 110 and second 120 sense circuits, and the output of the pulse width modulator comparator circuit 130.

The first sense circuit 110 includes error amplifier comparator 111. One terminal of the error amplifier comparator 111 is connected to the voltage feedback terminal Vfb that receives a voltage signal from auxiliary primary side transformer winding P2. This voltage signal is compared with a voltage reference signal (Vref1), received at the other input terminal of the error amplifier comparator 111. Based on this comparison, the first sense circuit 110 outputs an error signal. The error signal is provided to the inverting input of the pulse width modulator (PWM) comparator 130. Additionally, the error signal that is outputted by the error amplifier comparator 111 is made available at the error amplifier output Vc terminal.

The purpose of the error signal is to control the duty cycle applied by the control circuit 100 to the switch TR1 based on the voltage feedback. When the voltage feedback signal decreases, for example, the error signal causes the duty cycle of the switching or drive signal to increase.

Both (1) the connection between the auxiliary winding P2 of the transformer and the first sense circuit 110, and (2) the subsequent output to PWM comparator 130 and drive logic 140 define a first feedback path for the control circuit 100.

The EN/SYNC pin of the control circuit 100 is connected to Oscillator 160, the output of which is fed to adder 161 and subsequently to the non-inverting terminal of PWM comparator 130. Adder 161 may also receive an output from the second sense circuit 120, allowing, in preferred embodiments of the present invention, current feedback to be applied to the control of the switch TR1. PWM comparator 130 compares the signal from oscillator 160 and the error signal from the first sense circuit 110 and provides an output to drive logic circuit 140. Based on the output of PWM comparator 130, drive logic circuit 140 controls the duty cycle of the drive signal applied to gate drive terminal (Gdr) for controlling the switch TR1.

The second sense circuit 120 includes a comparator or differential amplifier 121 circuit. One terminal of the differential amplifier 121 is connected to the current sense terminal Isns, and the other terminal is connected to the ground terminal Gnd. The current sense terminal Isns receives a current signal from the switch TR1. Differential amplifier 121 measures the current across resistor R16 (and received at the Isns terminal) with respect to ground (0 V), and outputs a current control signal. The current control signal is passed to the adder 161 to optionally feed back a current control signal to the PWM controller 130, and is also passed to the current limit circuit 150.

The current limit circuit 150 includes a comparator 151. Comparator 151 receives the current control signal from the second sense circuit 120 and compares the current control signal with a reference signal Vref2 received at the other input terminal of the comparator 151. Reference signal Vref2 establishes an overcurrent threshold that detects an overcurrent condition at the switch TR1. When the current control signal from the second sense circuit 120 exceeds the overcurrent threshold, the current limit circuit 150 sends an overcurrent signal to the drive logic 140 causing the drive logic 140 to reduce the duty cycle of the switch signal applied to gate drive terminal (Gdr). The overcurrent signal has the effect of overriding the voltage dependent control of the switch TR1 based on the voltage feedback signal received at the first sense circuit 110 and passed to the drive logic 140 via PWM controller 130. Thus, when an overcurrent condition is detected, the drive logic 140 changes from a predominantly voltage dependent mode of operation to an overcurrent dependent mode of operation.

The voltage feedback signal received at voltage feedback terminal Vfb is also passed to short circuit protection circuit 170. Short circuit protection circuit 170 includes a comparator 171 that compares the voltage feedback signal received at the inverting input with a reference voltage, and hiccup oscillator 172. When the voltage feedback signal falls below the threshold voltage, the short circuit protection circuit 170 issues an output signal that initiates the hiccup mode of operation. The output signal from comparator 171 is first passed to hiccup oscillator 172, which subsequently outputs a periodic hiccup control signal to drive logic 140. The hiccup control signal received by the drive logic 140 causes the power supply to the switch TR1 to be shut off for a period of time, after which the power supply is restarted.

As noted above, the magnitude of reduction in feedback voltage used to trigger the hiccup mode operation may be 60%, for example. In the present preferred embodiment, the control circuit may therefore pass the reference voltage Vref1 signal via a 40:60 voltage divider arrangement 173 defined by resistors 4R, 6R to the non-inverting pin of the comparator 171.

In the present preferred embodiment, the voltage appearing on the error amplifier output terminal Vc is used to provide an additional feedback signal which is passed, via the comparator X1, to voltage feedback pin Vfb. This will be explained in more detail below.

The operation of the first preferred embodiment, under normal and overload conditions will now be described.

Normal Conditions

Under normal load and line variations, the auxiliary winding P2 output will track the changes of the output winding S1 and will achieve regulation without the use of additional feedback. Under normal load and line conditions, the voltage feedback loop in the PWM controller U1 controls the duty cycle and regulates the output voltage at the Gate Drive pin Gdr. As noted above, the output of the error amplifier (i.e., the error signal) of the PWM controller U1 is used to regulate the duty cycle and the output of the error amplifier is available (i.e., the error signal) at terminal Vc. In the normal mode of operation, the output of the error amplifier pin Vc of PWM controller U1 is about 1.6 V.

Under normal conditions, the voltage at the non-inverting pin of the comparator X1 is therefore 2.5 V due to the presence of the reference diode D2, while the voltage at the inverting pin is approximately 1.6 V. The voltage drop across R2 is not significant in comparison to the resistance of the charged capacitor C4. As a result, the output of the comparator X1 remains small, and the voltage sensed at voltage feedback terminal Vfb is largely the voltage output by the auxiliary winding P2.

Overload Conditions

In an overload situation, however, the output of the auxiliary winding P2 will not be able to track the reduction of the output voltage sufficiently closely due to imperfect cross regulation between the windings. As a result, no significant reduction in voltage is seen at the voltage feedback pin Vfb as a result of the voltage sense signal received from the auxiliary winding P2, and as a result hiccup mode will not be initiated as the voltage sense signal from the auxiliary winding P2 is not sufficient to trigger the short circuit protection mode circuit 170. Consequently, the overload power loss would therefore remain high. This deficiency is however addressed in the present preferred embodiment by feeding back the error signal from terminal Vc via a second or further feedback path.

During an overload, the current across the sense resistor R16 increases, and the voltage drop across the resistor R16 rises. The current sense circuit 120 of the PWM controller U1 in conjunction with the current limit circuit 150 detects an increase in voltage across the resistor R16 exceeding 0.4 V. When this threshold is reached, the operation of the PWM controller U1 enters an over-current situation in which the response of the PWM controller U1 is switched from being regulated by its internal voltage sense circuit (via terminal Vfb) to its internal current sense circuit (via terminal Isns). See the discussion above in connection with FIG. 3.

As a consequence, the drive logic 140 of the controller 100 reduces the duty cycle applied at the gate drive terminal Gdr so that the voltage and current at the primary P1 and secondary 51 side windings are reduced. Although the signal from the auxiliary winding P2 does not reduce sufficiently when compared with its normal regulated voltage to indicate an overload, the signal fed back to the terminal Vfb does reduces enough to cause the terminal Vfb to fall below its internal threshold (i.e., below reference voltage Vref1) for regulating the duty cycle. As a result, the error signal of the error amplifier 111, which operates based on the voltage sense signal received at feedback terminal Vfb, detects a reduction in voltage, and its output goes high to indicate that the duty cycle should be increased. Due to the current sense circuit 120 dominating the operation of the controller 100 via the overload signal to drive logic 140, the duty cycle is not however increased as a response to this error signal while the overload condition continues. In these circumstances, the Vc pin of PWM controller U1 goes high to its internal V+ supply rail of about 2.8 V.

In the present preferred embodiment, this high Vc output signal (2.8 V in this example) is fed back to the inverting terminal of the comparator X1. As before, the non-inverting terminal of the comparator X1 remains held at 2.5 V by the reference diode D2. The voltage at the non-inverting pin of the comparator X1 will therefore exceed the reference voltage of 2.5 V, and as a result, the comparator output saturates to a low voltage. This is fed into the voltage feedback pin Vfb of the PWM controller U1, and so pulls the voltage at the pin Vfb to a lower value, effectively providing a boosted feedback signal. The reduction provided by the signal output of comparator X1 in this case is configured to reduce the input at the Vfb pin to below the internal detection threshold (for example, 0.6×Vref1) for initiating hiccup mode via short circuit protection circuit 170. For example, assuming that the internal reference voltage at the Vfb pin to initiate hiccup mode is 0.72 V (60% of its reference voltage 1.2 V), the output of the comparator X1 must be sufficient when saturated to reduce the value at the Vfb pin to this value or less. The comparator X1 receiving the input from Vc pin and feeding the signal back to the voltage feedback pin Vfb therefore acts as a crowbar circuit for the PWM controller U1.

As before, the controller 100 operates such that the voltage feedback terminal Vfb acts as a first sense circuit to initiate hiccup mode receiving a first voltage sense signal from the auxiliary winding P2. However, as the first voltage sense signal from auxiliary winding P2 is not sufficient to initiate hiccup mode, it is boosted further by the signal output from the comparator X1. The comparator X1 is in turn operated using a second sense circuit 120, and a further or second feedback path is provided between the current sense circuit and the error amplifier output Vc fed back via the comparator X1. As a result, the hiccup feature of the controller 100 which usually only works with secondary side feedback can be made to operate reliably with primary side feedback.

The purpose of capacitor C4 is to give a slight delay to the measurement at the comparator's X1 inverting input to filter out the initial surge of current caused by startup into a large output capacitance. This allows the overcurrent event seen at startup due to the output capacitance charging up to be ignored. The timing for this capacitor may be based on the following equation: $T = -C4*R2*\log_n(1-V_{C4}/V_c)$, where T is the time in seconds, C4 is the capacitance C4 in Farads, R2 is the resistance R2 in Ohms, $V_{C4}$ is the voltage on C4 in volts, and Vc is the voltage on the error amp output pin.

So for example, if C4=47 nF, R2=100 kΩ, VC4=2.5 V (reference voltage on D2) and Vc=2.8V, $T=-47$ nF*100 kΩ*$\log_n(1-2.5 \text{ V}/2.8 \text{ V})=10.5$ ms.

Second Preferred Embodiment

Figure 4:
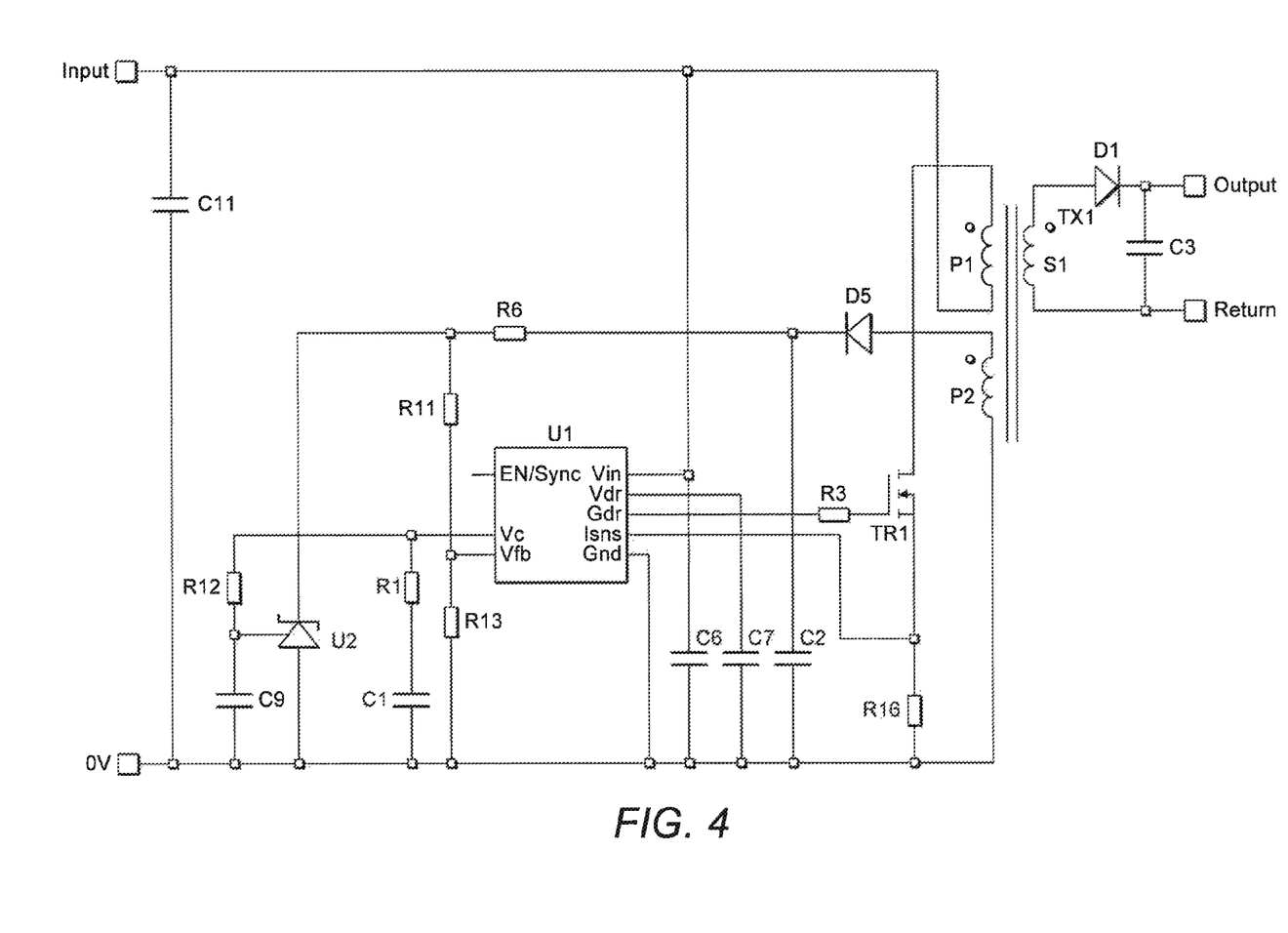
FIG. 4 is an illustration of a second preferred embodiment of the present invention.

A second preferred embodiment of the present invention will now be described with reference to FIG. 4. The components and operation of the circuit is the same as that for the first preferred embodiment. However, in FIG. 4, the comparator X1 and the reference diode D2 and resistor R4 are replaced with an adjustable precision shunt regulator U2. The shunt regulator has an internal 2.5 V reference connected to its comparator non-inverting input.

The cathode of the shunt regulator is connected to the auxiliary winding P2 via diode D5 and resistor R6. The inverting pin (ref pin) of the shunt regulator U2 is connected to the error amplifier output terminal Vc of PWM controller U1 through resistor R12. As before, the inverting pin is connected to an intermediate point between resistor R12 and capacitor C9 which connects to ground (0 V).

The output of the internal comparator (its cathode pin) is not connected directly to the voltage feedback pin Vfb of PWM controller U1 because it is only able to saturate to 2.5 V. An additional resistor R6 is therefore added into the auxiliary feedback potential divider to limit the current drawn from the auxiliary winding P2. The output pin of the shunt regulator U2 is therefore connected between resistors R6 and R11.

The shunt regulator U2 performs the same roles as the comparator circuit X1 of the first preferred embodiment. The values of the resistors are chosen so that when shunt regulators U2 is saturated to 2.5 V the feedback voltage into the voltage feedback pin Vfb of PWM controller U1 is less than 60% of its normal regulated voltage.

Timing for the capacitor C9 is based on the following equation: $T=-C9*R12*\log_n(1-V_{C9}/Vc)$, where T is the time in seconds, C9 is the capacitance C9 in Farads, R12 is the resistance R12 in Ohms, VC9 is the voltage on C9 in volts, and Vc is the voltage on error amplifier output pin. For example, when C4=47 nF, R12=100 kΩ, $VC_9$=2.5 V (reference voltage of U2) and Vc=2.8 V, $T=-47$ nF*100 kΩ*$\log_n(1-2.5 \text{ V}/2.8 \text{ V})=10.5$ ms.

Thus, an improved control circuit including isolation between the primary and second side windings, voltage regulation achieved through the auxiliary primary side winding, and hiccup mode protection has been described.

Preferred embodiments of the present invention provide a way of detecting that the power supply is in overload and causing a reduction in the feedback voltage to cause the controller to initiate its hiccup mode. Further, this is achieved without compromising the input to output isolation and without the need for opto-isolators or opto-couplers.

Preferred embodiments of the present invention have been described for the purposes of illustration only, and are not intended to limit the scope of the invention as defined by the following claims. Modifications and variations within the scope of the claims will be apparent to the skilled person.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A DC-to-DC converter comprising:
   a power input terminal;
   a power output terminal;

a transformer including a primary transformer coil connected to the power input terminal and a secondary transformer coil connected to the power output terminal;

a switching circuit including a switch and a switch controller, the switch controller controlling the duty cycle of the switch to supply a periodic signal to energize the primary transformer coil;

the switching circuit including:

a first sense circuit that detects a voltage condition of the transformer, the voltage condition received at the first sense circuit being used to regulate the duty cycle of the switch and to initiate a hiccup mode that dissipates power in the primary and/or secondary windings when the voltage condition detected at the first sense circuit indicates an overload of the transformer; and a second sense circuit that detects an over-current condition at the switch and/or primary winding;

an auxiliary winding electromagnetically coupled to the primary and/or the secondary transformer coils of the transformer that feeds back to the first sense circuit, via a first feedback path, a first signal indicating a voltage condition at the transformer; and a further feedback path connected between the second sense circuit and the first sense circuit that provides a second signal to the first sense circuit to boost the first signal when an overload is detected, and to initiate the hiccup mode.

2. The DC-to-DC converter of claim 1, wherein the first sense circuit includes a voltage sense circuit including:

a feedback terminal that receives the first signal; and a differential amplifier circuit.

3. The DC-to-DC converter of claim 1, wherein the voltage condition indicating an overload of the transformer is a reduction in the voltage sensed by the first sense circuit below a first threshold detected by the differential amplifier circuit.

4. The DC-to-DC converter of claim 3, wherein the auxiliary winding is electrically coupled to a feedback input terminal of the switch controller, via a diode and a resistor arranged in series.

5. The DC-to-DC converter of claim 2, wherein the comparator is an error amplifier that provides an output signal to regulate the duty cycle of the switch based on the first signal received at the first sense circuit;

the error amplifier provides an error signal that indicates whether the duty cycle should be increased or decreased;

the switch controller includes an error amplifier output pin at which the error signal is output.

6. The DC-to-DC converter of claim 5, wherein when the second sense circuit detects an overload current, the switch controller reduces the duty cycle of the switch, causing the error signal to saturate.

7. The DC-to-DC converter of claim 5, wherein the error signal from the error output pin of the switch controller is fed back to the first sense circuit as the second signal.

8. The DC-to-DC converter of claim 7, wherein the error signal is fed back to the first sense circuit via a comparator circuit, the comparator circuit comparing the error signal against a reference voltage, and outputting the second signal to the first sense circuit, when the error signal is detected as being sufficiently large in comparison to the reference voltage.

9. The DC-to-DC converter of claim 8, wherein the comparator circuit includes an operational amplifier.

10. The DC-to-DC converter of claim 9, wherein the error signal is input at an inverting pin of the operational amplifier, causing the operational amplifier to saturate to a low value when on overload is detected at the second sense circuit.

11. The DC-to-DC converter of claim 8, wherein the comparator circuit includes a diode regulator, and the error signal is input at the input pin of the diode regulator, causing the regulator to saturate to a low value when on overload is detected at the second sense circuit.

12. The DC-to-DC converter of claim 8, further comprising a capacitor connected between ground and an inverting pin of the operational amplifier or regulator diode.

* * * * *